(12) United States Patent
Schoenherr

(10) Patent No.: US 6,364,763 B1
(45) Date of Patent: *Apr. 2, 2002

(54) SPLIT APRON FORAGE BOX CONTAINER

(75) Inventor: Theodore F. Schoenherr, Mosinee, WI (US)

(73) Assignee: H&S Manufacturing Co., Inc., Marshfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/585,367

(22) Filed: Jun. 1, 2000

Related U.S. Application Data

(63) Continuation of application No. 09/264,738, filed on Mar. 8, 1999, now Pat. No. 6,129,630.

(51) Int. Cl.⁷ .............................. A01F 12/30; B07B 1/10
(52) U.S. Cl. .......................... 460/86; 56/228; 56/473.5
(58) Field of Search ............................. 56/228, 473.5, 56/DIG. 5; 414/528, 502, 505; 198/570, 817; 460/86

(56) References Cited

U.S. PATENT DOCUMENTS

| 258,242 | A | 5/1882 | Merritt |
| 1,188,810 | A | 6/1916 | Mitchell |
| 2,000,593 | A | 5/1935 | Happel |
| 2,257,744 | A | 10/1941 | Heyer |
| 2,417,580 | A | 3/1947 | Young |
| 2,504,624 | A | 4/1950 | Barnes |
| 2,603,979 | A | 7/1952 | Du Pont |
| 2,710,105 | A | 6/1955 | Schwartz |
| 2,962,176 | A | 11/1960 | Russell |
| 3,073,464 | A | 1/1963 | Hoover |
| 3,095,570 | A | 6/1963 | Warner |
| 3,209,932 | A | 10/1965 | Schiltz |
| 3,214,049 | A | 10/1965 | Grove |
| 3,360,999 | A | 1/1968 | Mullet |
| 3,366,257 | A | 1/1968 | Strom |
| 3,595,369 | A | 7/1971 | Boulay |
| 3,608,386 | A | 9/1971 | Pambid |

(List continued on next page.)

FOREIGN PATENT DOCUMENTS

| AU | 492682 | 7/1977 |
| GB | 2037913 | 11/1979 |
| IT | 428018 | 2/1947 |
| JP | 1-87957 A | 4/1989 |
| JP | 3-129170 A | 6/1991 |
| JP | 5-18448 A | 1/1993 |
| JP | 6-94125 A | 4/1994 |
| SU | 745418 | 7/1980 |

OTHER PUBLICATIONS

H&S Manufacturing Co., Inc. Brochure entitled "7+4" Forage Boxes, 4 pages, No Date.

Primary Examiner—Robert E. Pezzuto
Assistant Examiner—Árpád Fabián Kovács
(74) Attorney, Agent, or Firm—Patterson, Thuente, Skaar & Christensen, P.A.

(57) ABSTRACT

An apron system for use with a forage box container includes split aprons having a first apron and a second apron, the first apron having a pair of spaced apart, continuous, advancing chains, a plurality of spaced apart, transverse bars extending substantially between the pair of spaced apart chains, each of the plurality of bars being operably coupled to each of the pair of advancing chains, the first apron being disposed in a forage box container bed first portion. The second apron has a pair of spaced apart, continuous, advancing chains, a plurality of spaced apart, transverse bars extending substantially between the pair of spaced apart chains, each of the plurality of bars being operably coupled to each of the pair of advancing chains, the second apron being disposed in a forage box container bed second portion. A drive mechanism is operably coupled to the split apron system for imparting advancing motion to the advancing chains thereof.

43 Claims, 4 Drawing Sheets

U.S. PATENT DOCUMENTS

| | | | |
|---|---|---|---|
| 3,652,089 A | 3/1972 | O'Connor | |
| 3,722,722 A | 3/1973 | Blair | |
| 3,743,043 A | 7/1973 | Gelinas | |
| 3,748,759 A | 7/1973 | Liess | |
| 3,894,646 A * | 7/1975 | Head et al. | 414/505 |
| 4,004,677 A | 1/1977 | Heier | |
| 4,047,631 A | 9/1977 | Diz | |
| 4,068,769 A | 1/1978 | Sweet | |
| 4,072,242 A | 2/1978 | Cook | |
| 4,149,626 A | 4/1979 | Holt | |
| 4,196,859 A | 4/1980 | Trott | |
| 4,360,098 A | 11/1982 | Nordstrom | |
| 4,404,868 A | 9/1983 | Kleine | |
| 4,505,634 A | 3/1985 | Rezac | |
| 4,518,303 A | 5/1985 | Moser | |
| 4,601,629 A | 7/1986 | Zimmerman | |
| 4,674,994 A | 6/1987 | Tomiyori | |
| 4,756,659 A * | 7/1988 | Bader | 414/502 |
| 5,104,281 A | 4/1992 | Corvi | |
| 5,298,000 A | 3/1994 | Rattunde | |
| 5,413,451 A | 5/1995 | Pellegrino | |
| 5,788,837 A | 8/1998 | Hannum | |
| 6,129,630 A * | 3/1999 | Schoenherr | 460/86 |

* cited by examiner

SPLIT APRON FORAGE BOX CONTAINER

RELATED APPLICATIONS

The present application is a continuation of prior application Ser. No. 09/264,738, filed Mar. 8, 1999, issued as U.S. Pat. No. 6,129,630 on Oct. 10, 2000.

TECHNICAL FIELD

The present invention relates to a forage box container for hauling livestock feed or other field crops. More particularly, the present invention relates to an improved apron mechanism, the apron mechanism for delivering the feed contents of the box container toward a discharge opening in the forage box container for discharge from the forage box container.

BACKGROUND OF THE INVENTION

A forage box container is essentially a container utilized to transport livestock feed. The container may be mounted on a wagon chassis and towed by a powered vehicle. The container may be mounted on a truck chassis. The transport is usually from the field in which the feed was harvested to a feed storage facility, where the feed is stored for later provision to the livestock. Such transport is frequently along public roads, where maximum vehicle widths are set by the authorities and enforced.

Most commonly a forage box container is used to haul corn that is chopped as it is harvested from the field. In this condition, most of the entire corn plant is conveyed into the forage box container for transportation and later use as feed. Such corn may be quite heavy and may adhere to the side walls of the forage box container, especially when the corn is wet.

Forage box containers typically include powered mechanisms for removing the feed from the forage box container. These powered mechanisms typically include aprons in the floor of the forage box container. Aprons are specially shaped chains that are drawn lengthwise along the floor of the box container from the front to the rear of the box container. Bars, typically constructed of angle iron, are transversely affixed to the apron chains and are drawn forward by the apron chains, pulling the feed rearward in the box container as the bars move rearward. The feed is then discharged from the box container at the rear of the box container through an opening defined at the bottom of a top hinged rear door. The rear door also functions as a side member of the box container (in conjunction with the other three sides of the box container) when the rear door is in a latched and closed disposition.

Forage box containers typically have side mounted drive mechanisms for powering the aprons. The drive mechanisms are typically mounted exterior to the box container itself. The side mounting of these mechanisms has at least two disadvantages. The first is that the total width of the forage box container must conform to the maximum width of a vehicle permitted to travel on a highway. The width dimension of the drive mechanism (being mounted exterior to the box container itself) contributes to the total width of the forage box container. Accordingly, the box container width dimension of the forage box container must be reduced by the amount of the width of the drive mechanism in order for the forage box container to be in compliance with the maximum width limitation for travel on a highway. The reduced width of the box container substantially reduces the capacity of the box container, requiring more trips to transport a given quantity of feed.

A second disadvantage of the side mounted drive mechanism is that the apron bars are powered from only the side of the forage box container on which the drive mechanism is mounted. Heavy, wet feed in the forage box container adheres to the inner sides of the forage box container and resists being moved rearward by the aprons for discharge. Since the aprons are powered only at one side, great spanwise bending forces are generated in the individual bars of the apron mechanism. These forces may bend the bars or twist the bars to such a degree that the apron mechanism becomes inoperable. The feed must then be manually removed from the forage box container and repairs of the apron mechanism effected before the forage box container may be used again.

What is needed in the industry is a forage box container in which the width of the box container can take full advantage of the maximum width dimension allowable for travel on a highway in order to maximize the capacity of the box container. Further, it would be an advantage to minimize the effects that a load of heavy, wet feed can have on the apron mechanism.

SUMMARY OF THE PRESENT INVENTION

The forage box of the present invention substantially meets the aforementioned needs of the industry. The width dimension of the box container is substantially the full dimension (typically, eight feet) allowable for transport on public highways, thereby maximizing the capacity of the box container. Further, the drive mechanism for the apron mechanism is centered in the box container with a split apron bar disposed on either side of the drive mechanism. By powering the apron mechanism from a center position, the twisting forces generated on the apron mechanism by the act of trying to discharge feed from the box container are substantially reduced and the potential for damaging the apron mechanism during feed discharge operations is minimized.

The present invention is an apron system for use with a forage box container include split aprons having a first apron and a second apron, the first apron having a pair of spaced apart, continuous, advancing chains lying along a forage box container longitudinal dimension, a plurality of spaced apart, transverse bars extending substantially between the pair of spaced apart chains, each of the plurality of bars being operably coupled to each of the pair of advancing chains, the first apron being disposed in the forage box container bed first half. The second apron has a pair of spaced apart, continuous, advancing chains lying along the forage box container longitudinal dimension, a plurality of spaced apart, transverse bars extending substantially between the pair of spaced apart chains, each of the plurality of bars being operably coupled to each of the pair of advancing chains, the second apron being disposed in the forage box container bed second half. A drive mechanism is disposed substantially coincident with the forage box container longitudinal axis and being operably coupled to the split apron system for imparting advancing motion to the advancing chains thereof. The present invention is further a forage box container that includes the above described apron system. Additionally, the present invention is a forage box container wagon that includes the above described apron system.

DETAILED DESCRIPTION OF THE DRAWINGS

Figure 1:
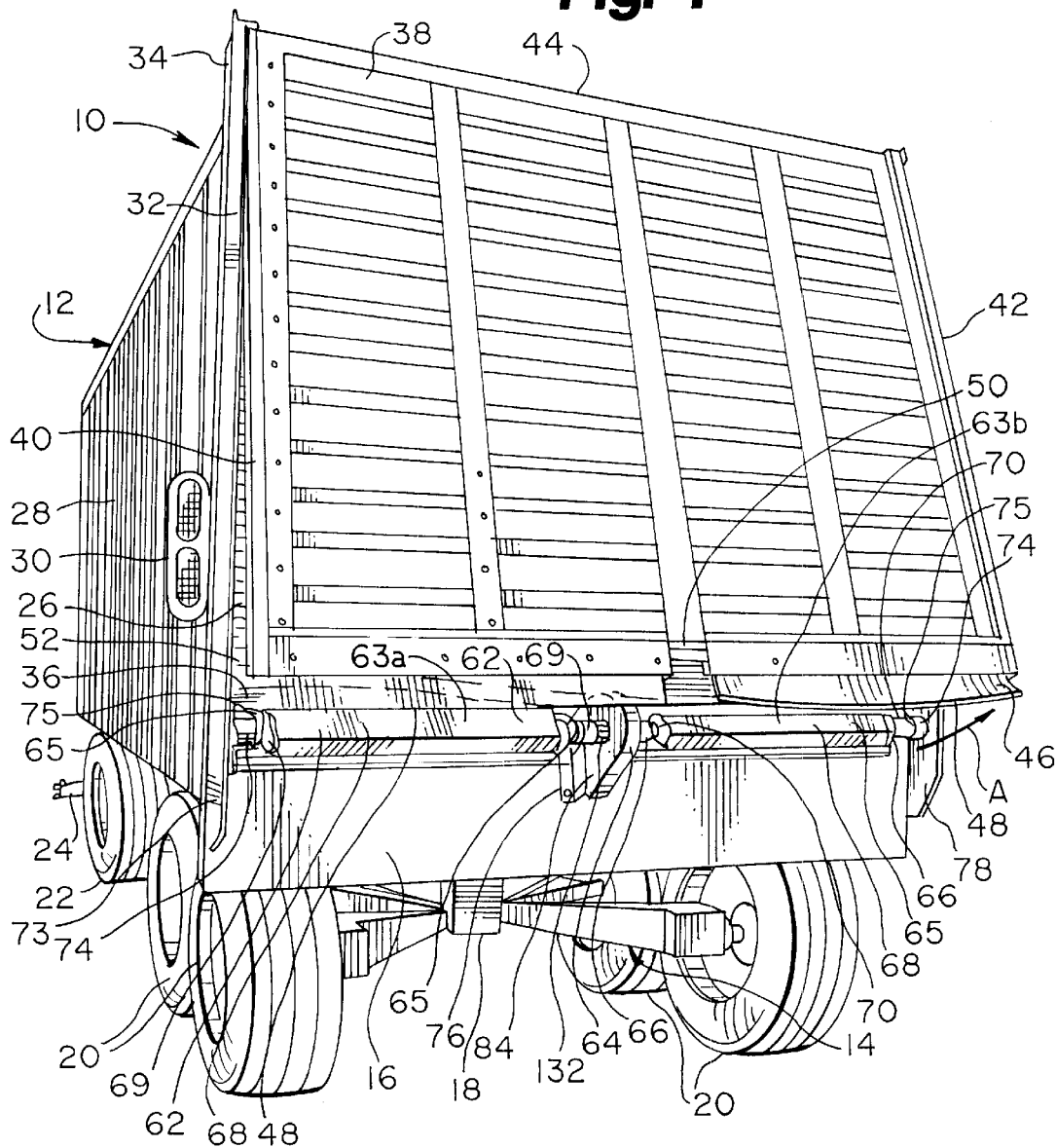
FIG. 1 is a left rear perspective view of a forage box container having the split apron system of the present invention.

The forage box container of the present invention is shown generally at 10 in the figures. As depicted in FIG. 1, the forage box container is a wagon to be pulled behind a motorized vehicle such as an agricultural tractor. The forage 10 may also be mounted on a truck chassis or the like and thereby be self-propelled. In the depiction of FIG. 1, the forage box container 10 is comprised of two major components: box container 12 and chassis 14. When the forage box container 10 is mounted on a truck, some of the components of the chassis 14 may be truck components. While the reference throughout is to a forage box, it is understood that the present invention is equally applicable to other containers from which material must be removed largely by gravity through an opening located proximate a lower container disposition.

Figure 3:
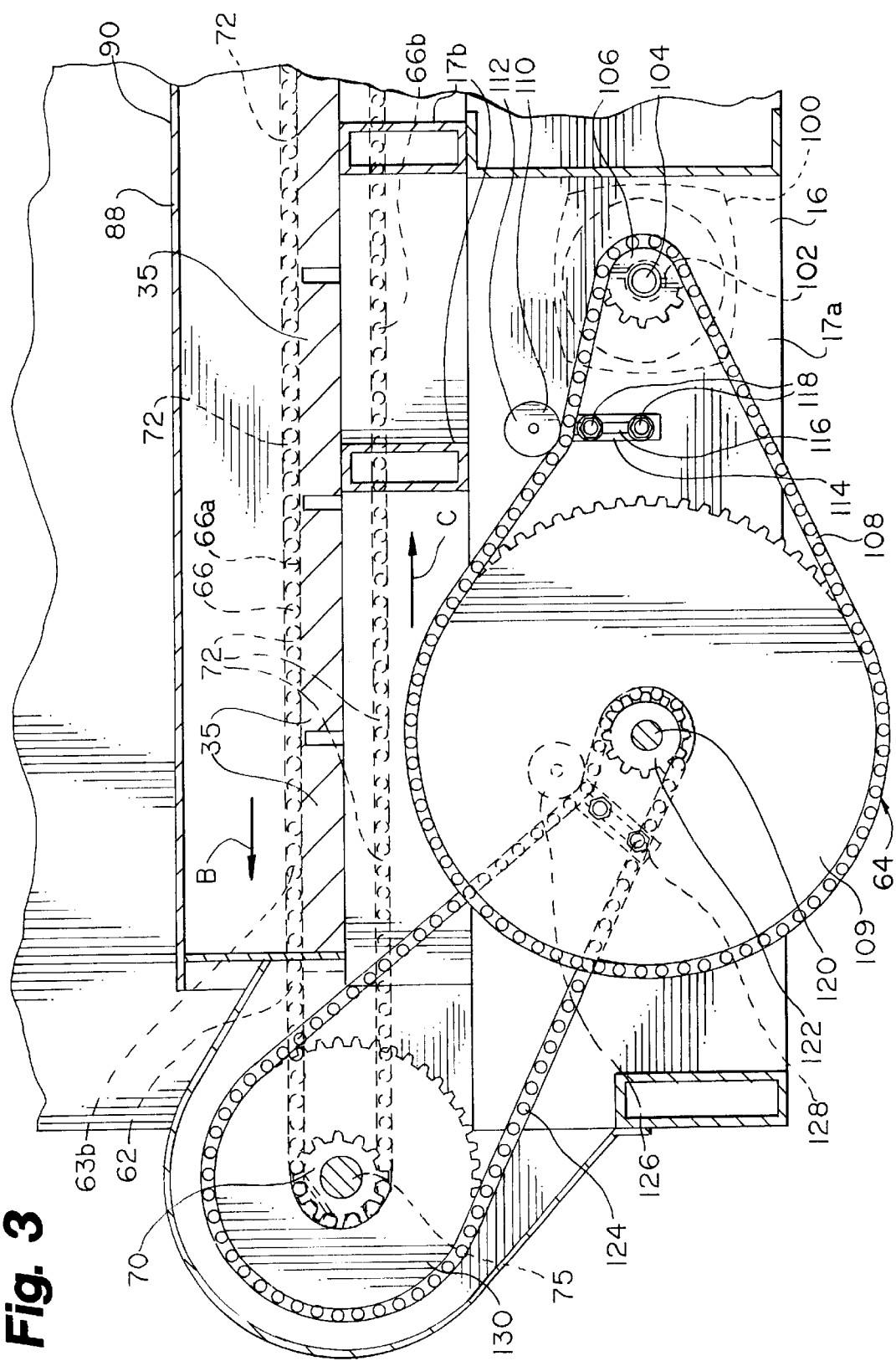
FIG. 3 is a right side elevational sectional view taken along the section lines 3—3 of FIG. 5 depicting the split apron system drive mechanism with a portion of the forage box container frame and bed.

The chassis 14 of the forage box container 10 preferably has a plurality of chassis members forming a frame box 16. A rear portion of a central longitudinal chassis member 17a is depicted in FIG. 3. The frame box 16 additionally is comprised of a plurality of chassis cross members 17b. Several of the chassis cross members 17b are depicted in FIG. 3, supported by longitudinal chassis member 17a.

The chassis 14 further has rear suspension 18, as depicted in FIG. 1. The rear suspension 18 is preferably fixedly coupled to the frame box 16. The rear suspension 18 includes a plurality of rear wheels 20.

The chassis 14 additionally includes a front suspension (not shown). The front suspension is rotatably coupled to the frame box 16 and supports a pair of front wheels 22. A tongue 24 is coupled to the front suspension for drawing and steering the forage box container 10.

The box container 12 of the forage box container 10 includes an upright front wall 26. Spaced apart side walls 28 are joined to the side margins of the front wall 26. Side walls 28 preferably include rear lights 30 for communicating with traffic behind the forage box container 10. The side walls 28 additionally include an upright stanchion 32 that forms the rear margin of each of the side walls 28. It should be noted that the upright stanchion 32 projects upward beyond the upper margin of the side walls 28. Each of the upright stanchions 32 has a hinge 34 disposed proximate to the upper margin of the respective upright stanchion 32.

A bed 36 forms the bottom portion of the box container 12. The bed 36 is preferably formed of a plurality of wooden slats 35 disposed transversely within the box container 12, as depicted in FIG. 3.

A rear door 38 is disposed opposite and spaced apart from the front wall 26. The rear door 38 has a height dimension that is substantially co-extensive with the height dimension of the upright stanchion 32 thereby projecting above the upper margin of the side walls 28. The rear door 38 is supported by the hinges 34 of the upright stanchions 32.

The rear door 38 is preferably parallelogram shaped, having spaced apart parallel rear door side margins 40, 42, a top margin 44, and an opposed parallel bottom margin 46. A flexible skirt 48 preferably depends from the bottom margin 46 of the rear door 38. A drive cutout 50 is preferably formed centrally to the bottom margin 46 of the rear door 38.

The rear door 38 is pivotable about the hinges 34 and is latchable at the bottom margin 46 thereof. The rear door 38 may be unlatched and pivoted rearward on the hinges 34 as indicated by arrow A to define a discharge opening 52 for the discharge of forage from the forage box container 10.

Figure 2:
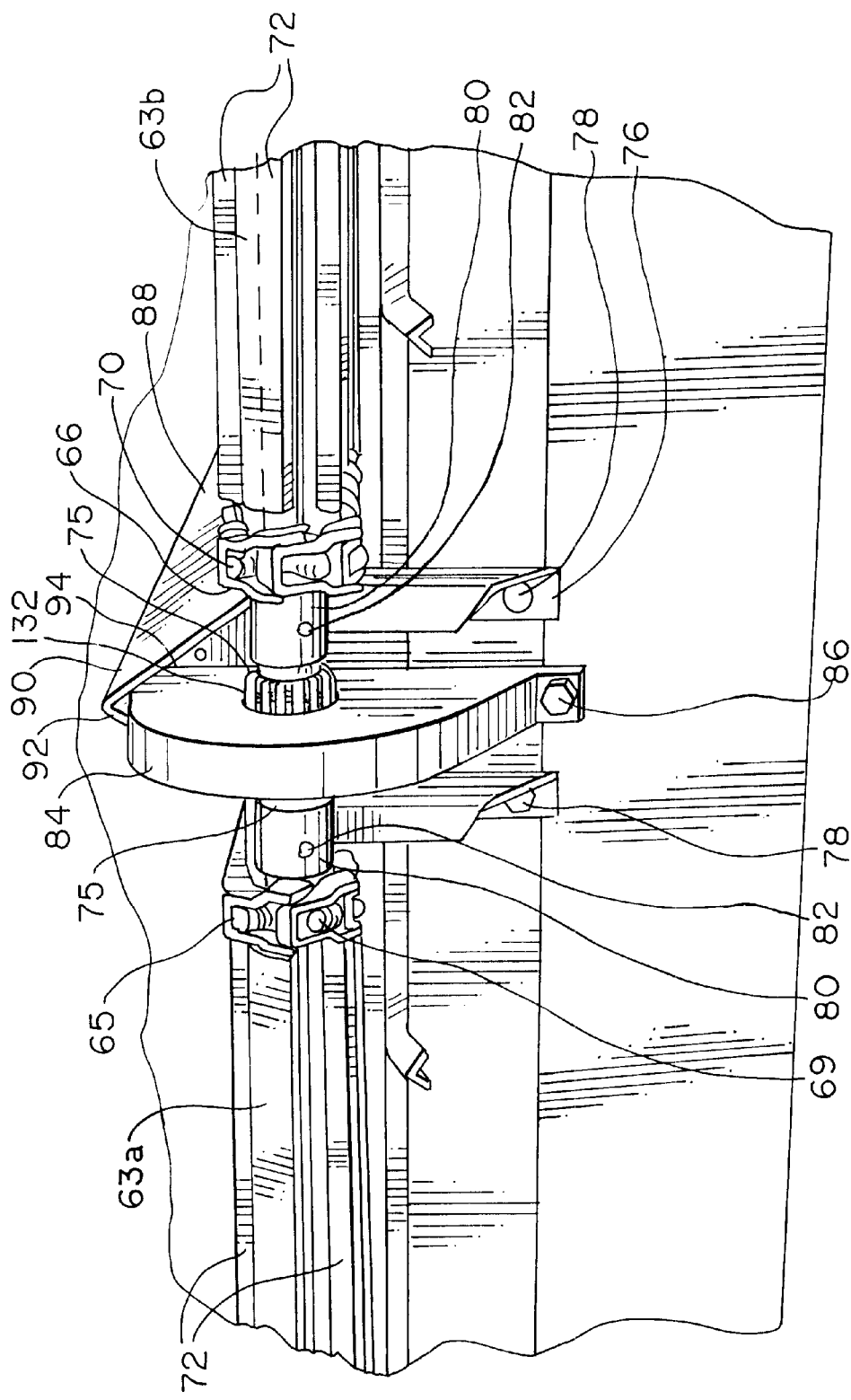
FIG. 2 is a fragmentary right rear perspective view of the split apron system of FIG. 1.

Referring to FIGS. 1 and 2, the forage box container 10 includes an apron mechanism 60. The apron mechanism 60 has two major components: split apron 62 and drive mechanism 64. The split apron 62 essentially has a left apron 63a that extends generally from the left margin of the bed 36 to the center of the bed 36 and a right apron 63b that extends generally from the right margin of the bed 36 to the center of the bed 36. The drive mechanism lies substantially along a longitudinal axis 65 (FIG. 1) of the forage box container 10.

The split apron 62 is comprised generally of continuous advancing chains 65, 66 and a plurality of spaced apart generally parallel movable bars 68. The bars 68 are advanced along the bed 34 of the box container 12 by the advancing chains 65, 66. The bars 68 of the left apron 63a are coupled to the advancing chain 65. The bars 68 of the right apron 63b are coupled to the advancing chain 66.

The two advancing chains 65 of the left apron 63a are engaged with the teeth of spaced apart sprockets 69. See FIGS. 1 and 2. The two advancing chains 66 of the right apron 63b are engaged with the teeth of spaced apart sprockets 70. Referring to FIG. 3, rotation of the sprockets 69, 70 in a counterclockwise direction results in advancement of the upper portion 66a of the advancing chain 66 along the upper surface of the bed 36. Simultaneously, the lower portion 66b of the advancing chain 66 is retreating toward the front of the forage box container 10 beneath the bed 36. This motion of the upper portion 66a and bottom portion 66b of the advancing chain 66 is depicted by the arrows B and C. It should be understood that simultaneously with the motion of the advancing chain 66 of the right apron 63b, as depicted in FIG. 3, similar motion is imparted to the advancing chain 65 of the left apron 63a. Each of the bars 68 includes an upwardly directed slat 72. Rearward advancement of the upwardly directed slats 72 as depicted by arrow B acts on the forage deposited in the forage box container 10 to drag the forage rearward toward the discharge opening 52 to discharge the forage from the forage box container 10.

A pair of spaced apart side wall journals 74 are supported on the inner side of each of a pair of spaced apart, rearwardly directed flanges 73. The flanges 73 are fixedly coupled to the frame box 16 and to the rear margin of the upright stanchions 32. A drive shaft 75 is rotatably supported in the side wall journals 74. The drive shaft 75 is fixedly coupled to the sprockets 69, 70 and is rotatably coupled to the drive mechanism 64 of the apron mechanism 60.

The drive mechanism 64 includes a bracket 76 as depicted in FIGS. 1 and 2. The bracket 76 is bolted to the frame box 16 by bolt 78. Left and right drive journals 80 are supported by the bracket 76. The drive shaft 75 is rotatably supported by a bore defined in the left and right drive journals 80. A grease fitting 82 is provided in each of the drive journals 80 for lubricating the interface between the drive shaft 75 and the drive journals. A sprocket cover 84 is fixedly coupled to the frame box 16 by a bolt 86. The sprocket cover 84 resides in the cutout 50 when the rear door 38 is latched closed.

A peaked shroud 88 extends the full lengthwise dimension of the bed 36 of the box container 12 and spans the lateral distance between the left split apron 63a and the right split apron 63b. The shroud 88 is generally positioned between the innermost advancing chain 65 of the left split apron 63a and the innermost advancing chain 66 of the right split apron 63b along the longitudinal axis 65 of the forage box container 10. The shroud 88 has a shroud peak 90 defined by the intersection of an angled shroud left side 92 and an angled shroud right side 94.

The drive mechanism 64 of the apron mechanism 60 is depicted in FIG. 3. An orbit motor 100, depicted in phantom, is disposed on the left side of the central longitudinal chassis member 17a. The orbit motor 100 may be driven by hydraulic fluid or other suitable source of motivation. The orbit motor 100 is coupled to the chassis member 17a in registry with a bore 102 defined in the chassis member 17a. The orbit motor 100 drive shaft 104 projects through the bore 102. The drive shaft 104 is fixedly coupled to a toothed drive pinion 106.

The drive pinion 106 is driveably engaged with the links of a primary chain 108. The primary chain 108 is continuous and extends around a relatively large primary sprocket 109. The primary chain 108 is tensioned by a primary tensioner 110.

The primary tensioner 110 has a roller 112 that is engaged with the primary chain 108. Tension of the roller 112 bearing on the primary chain 108 is adjusted by selective positioning of a tensioner bracket 114. The bracket 114 has art elongate slot 116 defined therein. A pair of bolts 118 pass through the slot 116 and are engaged with threaded bores (not shown) defined in the longitudinal central chassis member 17a. Alternatively, either or both of the bolts 118 could be a threaded stud welded at a first end to the longitudinal central chassis member 17a with a nut on each stud securing the bracket 114 to the longitudinal central chassis member 17a. Other suitable connectors can also be used. Positioning the bracket 114 with respect to the bolts 118 affects the tension exerted by the roller 112 on the primary chain 108.

The primary sprocket 109 is borne on a rotatable primary shaft 120. The primary shaft 120 is rotatably supported in a journal (not shown) that is fixedly coupled to the right side of the central longitudinal chassis member 17a. A secondary pinion 122 is fixedly coupled to the primary shaft 120 and mounted coaxially with primary sprocket 109. A secondary chain 124 extends around the secondary pinion 122. The secondary chain 124 is tensioned by a secondary tensioner 126 that is slidably coupled to the central longitudinal chassis member 22a by bolts 128. The secondary tensioner 126 exerts a desired amount of tension on the secondary chain 124 in a manner similar to that exerted by the primary tensioner 110 on the primary chain 108.

The secondary chain 124 extends around the secondary sprocket 130. The secondary sprocket 130 is fixedly coupled to splined couplers 132, depicted in FIGS. 1 and 2. The splined couplers 132 are fixedly engaged with the drive shaft 75.

In operation, the rear door 38 of the box container 12 is latched closed for filling of the forage box container 10 with forage and for transport of the forage box container 10. Typically the forage box container 10 is filled by blowing or augering forage into the open top of the forage box container 10.

To discharge a load of forage from the forage box container 10, the rear door 38 is unlatched and swung open on the hinges 34, as indicated by arrow A, to define the discharge opening 52. The drive mechanism 64 of the apron mechanism 60 may then be powered to simultaneously activate the left and right split aprons 63a, 63b of the split apron system 62.

Power is applied to the orbit motor 100, causing rotational motion of the drive pinion 106. This rotational motion is transmitted through the primary sprocket 109 to the secondary sprocket 130 by means of the primary chain 108 and the secondary chain 124. Such motion results in counterclockwise rotation of the secondary sprocket 130, as depicted in FIG. 3. Such rotation of the secondary sprocket 130 imparts corresponding rotation to the drive shaft 75 that drives both the left split apron 63a and the right split apron 63b. The drive shaft 75, acting through the respective sprockets 69, 70, imparts advancing motion to the advancing chains 65, 66, respectively. Such advancing motion causes the upper portion of the advancing chains 65, 66 as indicated by the upper portion 66a in FIG. 3 to advance rearward parallel to the longitudinal axis 65 across the upper surface of the bed 36 as indicated by the arrow B. A corresponding motion is imparted to the upper portion (not shown) of advancing chain 65. Such advancing motion causes the slats 72 to engage the forage in the forage box container 10, thereby pulling the forage rearward for discharge from the discharge opening 52.

By positioning the drive mechanism 64 centrally along the longitudinal axis of the forage box container 10, power is evenly transmitted to both the left split apron 63a and the right split apron 63b to minimize the torquing action that prior art side-mounted drive mechanisms caused. The shroud 88 acts to direct the forage to either the left or the right side of the shroud 88 to be engaged by the respective left and right split apron 63a, 63b.

Figure 4:
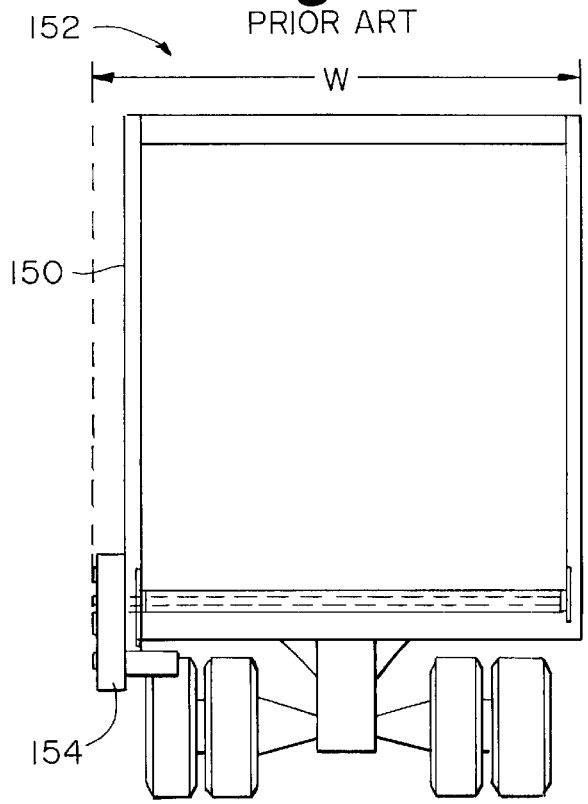
FIG. 4 is a rear elevational view of a prior art forage box container.
Figure 5:
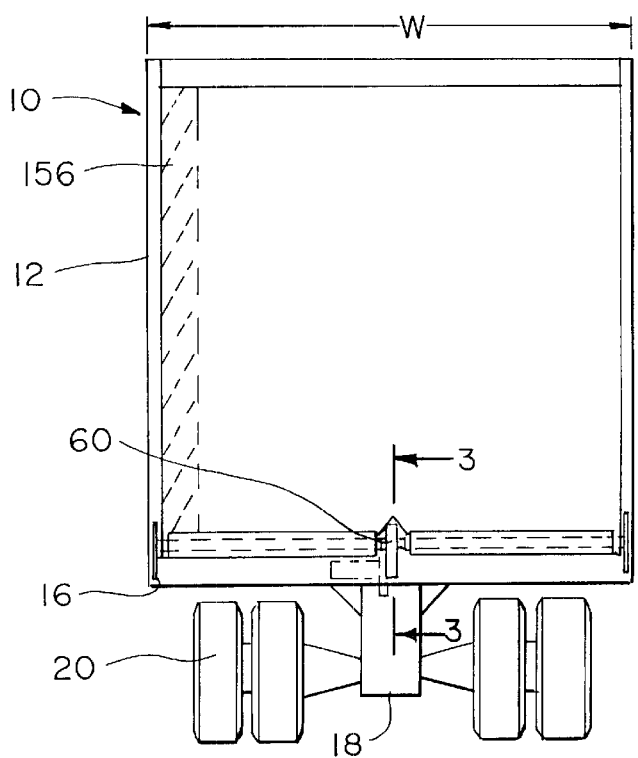
FIG. 5 is a rear elevational view of a forage box container of the present invention corresponding in width the prior art forage box container of FIG. 4 to demonstrate the increased width of the present invention box container.

Referring to FIGS. 4 and 5, a further advantage of the split apron of the present invention is apparent. The width dimension W, as depicted in the prior art depiction of FIG. 4 and in FIG. 5 depicting the forage box container of the present invention is the same dimension. The width dimension W is the maximum permitted width for travel on public highways. Typically this dimension is eight feet. As indicated in the prior art figure, FIG. 4, the width of the box container 150 of the prior art forage box container 152 was necessarily reduced by an amount equal to the width dimension of the side mounted drive mechanism 154. With the centrally mounted apron mechanism 60 of the present invention as depicted in FIG. 5, the box container 12 of the forage box container 10 may be increased by an amount equal to the width of the side mounted drive mechanism 154 as compared to the prior art forage box container 152 of FIG. 4. The volume that is recouped is represented by the hatched area 156 of FIG. 5.

Those skilled in the art will recognize that there are numerous variations and modifications of this invention which are encompassed by its scope. Accordingly, the foregoing description should be considered illustrative of the invention and not deemed to limit its scope.

I claim:

1. A load discharge mechanism for use with a forage box container, the forage box container having a forage box container bed and a longitudinal axis and a transverse axis, the longitudinal axis dividing the forage box container bed into a first portion and a substantially equal second portion, the forage box container bed having a first side margin and a spaced apart second side margin, the load discharge mechanism comprising:

a split apron system having a first apron and a second apron, the first apron having a first pair of spaced apart, continuous, advancing chains, a first one of the first pair of spaced apart, continuous, advancing chains being disposed proximate the first side margin of the forage box container bed and a second one of the first pair of spaced apart, continuous, advancing chains being disposed proximate the longitudinal axis of the forage box container bed, a first plurality of spaced apart, transverse bars extending substantially between the pair of spaced apart chains over the entire span of the spaced apart chains, each of the plurality of bars being operably coupled to each of the first pair of advancing chains, the first apron being disposed in the forage box container bed first portion, the second apron having a second pair of spaced apart, continuous, advancing chains, a first one of the second pair of spaced apart, continuous, advancing chains being disposed proximate the second side margin of the forage box container bed and a second one of the second pair of spaced apart, continuous, advancing chains being disposed proximate the longitudinal axis of the forage box container bed a second plurality of spaced apart, transverse bars extending substantially between the second pair of spaced apart chains over the entire span of the spaced apart chains, each of the plurality of bars being operably coupled to each of the second pair of advancing chains, the second apron being disposed in the forage box container bed second portion;

a drive mechanism disposed substantially between the first and second aprons and being operably coupled to the split apron for imparting advancing motion to the advancing chains thereof, said advancing motion acting to impart continuous advancing motion to a bulk product disposed on the forage box container bed for the continuous discharge of the bulk product therefrom; and a shroud being disposed between the first apron and the second apron and extending along the forage box container bed.

2. The load discharge mechanism of claim 1 wherein at least a first portion of the load discharge mechanism is disposed in a forage box container discharge opening, proximate a first shroud end margin.

3. The load discharge mechanism of claim 2 wherein the at least a first portion of the load discharge mechanism that is disposed in a forage box container discharge opening includes a chain driven sprocket, the sprocket being operably, rotatably coupled to a drive shaft, the drive shaft being operably coupled to the split apron for imparting advancing motion to the advancing chains thereof.

4. The load discharge mechanism of claim 3 wherein at least a second portion of the drive mechanism is disposed beneath the forage box container bed and proximate the forage box container discharge opening, the second portion of the drive mechanism being operably coupled to the first portion of the drive mechanism.

5. The load discharge mechanism of claim 2 wherein the drive mechanism includes a rotary drive motor and reduction gearing operably coupled to the first portion of the drive mechanism for rotational actuation thereof.

6. The load discharge mechanism of claim 5 wherein the drive mechanism rotary drive motor is hydraulically actuated.

7. The load discharge mechanism of claim 5 wherein the drive mechanism reduction gearing is chain driven and includes a primary sprocket and a secondary sprocket for rotational speed reduction.

8. The load discharge mechanism of claim 3 further including drive mechanism bracket means being operably, fixedly coupled to the forage box container and having a pair of spaced apart journals, a first journal being disposed to rotatably support a first end of the chain drive shaft and a second journal being disposed to rotatably support a second end of the chain drive shaft.

9. The load discharge mechanism of claim 8 further including a sprocket cover operably coupled to the forage box container and substantially enclosing the chain driven sprocket for shielding the sprocket from discharged forage.

10. A forage box container having a forage box container bed, the forage box container bed into a first portion and a second portion along a longitudinal axis, the forage box container comprising:

a split apron system having a first apron and a second apron, the first apron being disposed on a forage box container bed first portion, the second apron being disposed on a forage box container bed second portion the split apron first apron having a first pair of spaced apart, continuous, advancing chains lying along the forage box container bed, a first plurality of spaced apart, transverse bars extending substantially between the first pair of spaced apart chains, each of the first plurality of bars being operably coupled to each of the first pair of advancing chains, the first apron being disposed in the forage box container bed first portion, the split aprons second apron having a second pair of spaced apart, continuous, advancing chains lying along the forage box container bed, a second plurality of spaced apart, transverse bars extending substantially between the second pair of spaced apart chains, each of the second plurality of bars being operably coupled to each of the second pair of advancing chains, the second apron being disposed in the forage box container bed second portion;

a drive mechanism disposed substantially between the first and second apron and being operably coupled to the split apron for imparting advancing motion to the first apron and the second apron, said advancing motion acting to impart continuous advancing motion to a bulk product disposed on the forage box container bed for the continuous discharge of the bulk product therefrom, the drive mechanism for imparting advancing motion to the advancing chains thereof; and a shroud being disposed between the first apron and the second apron and extending along the forage box container bed.

11. The forage box container of claim 10 wherein at least a first portion of the drive mechanism is disposed in a forage box container discharge opening, proximate a forage box container bed end margin.

12. The forage box container of claim 11 wherein the at least a first portion of the drive mechanism that is disposed in a forage box container discharge opening includes a chain driven sprocket, the sprocket being operably, rotatably coupled to a drive shaft, the drive shaft being operably coupled to the split apron for imparting advancing motion to the advancing chains thereof.

13. The forage box container of claim 12 wherein at least a second portion of the drive mechanism is disposed centrally beneath the forage box container bed and proximate the forage box container discharge opening, the second portion of the drive mechanism being operably coupled to the a first portion of the drive mechanism.

14. The forage box container of claim 11 wherein the drive mechanism includes a rotary drive motor and reduction gearing operably coupled to the at least a first portion of the drive mechanism for rotational actuation thereof.

15. The forage box container of claim 14 wherein the drive mechanism rotary drive motor is hydraulically actuated.

16. The forage box container of claim 14 wherein the drive mechanism reduction gearing is chain driven and includes a primary sprocket and a secondary sprocket for rotational speed reduction.

17. The forage box container of claim 12 further including drive mechanism bracket means operably, fixedly coupled to the forage box container and having a pair of spaced apart journals, a first journal being disposed to rotatably support a first end of the chain drive shaft and a second journal being disposed to rotatably support a second end of the chain drive shaft.

18. The forage box container of claim 17 further including a sprocket cover operably coupled to the forage box container and substantially enclosing the chain driven sprocket for shielding the sprocket from discharged forage.

19. A method of continuously discharging a bulk product disposed in forage box container, comprising:
 disposing a continuous split apron system longitudinally with respect to a container bed to substantially span a container bed topside and a container bed underside from a first container bed end margin to a second container bed end margin;
 providing a plurality of bars spaced continuously along the continuous split apron system;
 disposing a drive mechanism substantially along a container bed longitudinal axis;
 bringing the portion of the plurality of transverse bars spanning the container bed topside into contact with the bulk product;
 disposing a shroud extending along a substantially full longitudinal dimension of the forage box container bed overlying a portion of the continuous split apron system; and
 activating the drive mechanism to impart a continuous advancing motion to the split apron system, said motion rotating the split apron system relative to the container bed the advancing bars of the split apron system acting to continuously advance the bulk product for discharge from the container bed.

20. The method of claim 19 including the split apron system having a first apron and a second apron.

21. The method of claim 20 including:
 driving the first apron with a first pair of spaced apart, continuous, advancing chains;
 disposing a first one of the first pair of spaced apart, continuous, advancing chains being proximate a first side margin of the forage box container bed;
 disposing a second one of the first pair of spaced apart, continuous, advancing chains proximate a longitudinal axis of the forage box container;
 driving the second apron with a second pair of spaced apart, continuous, advancing chains;
 disposing a first one of the second pair of spaced apart, continuous, advancing chains being disposed proximate a second side margin of the forage box container bed; and
 disposing a second one of the second pair of spaced apart, continuous, advancing chains being disposed proximate the longitudinal axis of the forage box container bed.

22. The method of claim 21 including:
 disposing the drive mechanism substantially between the first and second aprons; and
 operably coupling the drive mechanism to the split apron for imparting advancing motion to the advancing chains thereof, said advancing motion acting to impart continuous advancing motion to a bulk product disposed on the forage box container bed for the continuous discharge of the bulk product therefrom.

23. The method of claim 22 including disposing the shroud between the first apron and the second apron and extending along a substantially full longitudinal dimension of the forage box container bed.

24. The method of claim 22 including providing a drive mechanism chain driven sprocket, operably, rotatably coupling the sprocket to a drive shaft, and operably coupling the drive shaft to the split apron.

25. The method of claim 24 including operably coupling a rotary drive motor to the chain driven sprocket and reducing the rotation of the chain drive sprocket by means of reduction gearing.

26. The method of claim 25 including hydraulically actuating the drive mechanism rotary drive motor.

27. The method of claim 25 including reducing rotational speed of the chain drive sprocket by means of a primary sprocket and a secondary sprocket operably interposed between the rotary drive motor and the chain driven sprocket.

28. A forage box container having a forage box container bed, a split apron system, and a drive mechanism, the forage box container bed being divided into a first portion and a second portion along a longitudinal axis, the forage box container comprising, the split apron system having a first apron and a second apron, the first apron being disposed on a forage box container bed first portion, the second apron being disposed on a forage box container bed second portion, and the drive mechanism being disposed substantially between the first and second aprons and being operably coupled to the split apron system for imparting advancing motion to the first apron and the second apron, said advancing motion acting to impart continuous advancing motion to a bulk product disposed on the forage box container bed for the continuous discharge of the bulk product therefrom; the forage box container comprising:
 a high rear door pivot point, the high rear door pivot point being elevated above a container side wall upper margin.

29. The forage box container of claim 28 wherein the high rear door pivot point is supported on a pair of spaced apart upright stanchions, the stanchions having an upper margin that is elevated above a container side wall upper margin.

30. The forage box container of claim 29 further including a rear door rotatably suspended from the high hinge point, the rear door having a height dimension that is substantially coextensive with an upright stanchion height dimension.

31. The forage box container of claim 28 further including a rear door, the rear door having a bottom margin, a flexible skirt depending from the bottom margin.

32. The forage box container of claim 31 wherein a drive cutout is defined substantially central to the rear door bottom margin.

33. A forage box container having a forage box container bed, a split apron system, and a drive mechanism, the forage box container bed being divided into a first portion and a second portion, the forage box container comprising, the split apron system having a first apron and a second apron, the first apron being disposed on a forage box container bed first portion, the second apron being disposed on a forage box container bed second portion, and the drive mechanism being disposed substantially between the first and second aprons and being operably coupled to the split apron system for imparting advancing motion to the first apron and the second apron, said advancing motion acting to impart continuous advancing motion to a bulk product disposed on the forage box container bed for the continuous discharge of the bulk product therefrom; the forage box container comprising:

the drive mechanism having a centrally disposed sprocket, the sprocket being disposed proximate a container discharge opening and being operably coupled to the split apron system for imparting motion thereto carrying the first and second aprons along the container bed; and a shroud extending substantially the length of a container bed, the shroud overlying the drive chain.

34. The forage box container of claim 33 further including a drive shaft extending substantially the width of the container bed and being operably rotatably coupled to the sprocket, the drive shaft being operably coupled to the first and second aprons for imparting the motion thereto carrying the first and second aprons along the container bed.

35. The forage box container of claim 34 further including a drive chain extending substantially the length of the container bed and being operably rotatably coupled to the sprocket, the drive chain being operably coupled to the first and second aprons for imparting the motion thereto carrying the first and second aprons along the container bed.

36. The forage box container of claim 33 wherein the shroud has a central peak formed at the apex of two inclined sides.

37. The forage box container of claim 33 further including a sprocket cover being disposed over the sprocket.

38. The forage box container of claim 33 wherein the sprocket is chain driven.

39. The forage box container of claim 33 wherein the width dimension of the container is substantially equal to the maximum permitted width for travel on public highways.

40. The forage box container of claim 33 wherein the width dimension of the container is substantially eight feet.

41. A forage box container having a forage box container bed, a split apron system, and a drive mechanism, the forage box container bed being divided into a first portion and a second portion, the forage box container comprising, the split apron system having a first apron and a second apron, the first apron being disposed on a forage box container bed first portion, the second apron being disposed on a forage box container bed second portion, and the drive mechanism being disposed substantially between the first and second aprons and being operably coupled to the split apron system for imparting advancing motion to the first apron and the second apron, said advancing motion acting to impart continuous advancing motion to a bulk product disposed on the forage box container bed for the continuous discharge of the bulk product therefrom; the forage box container comprising:

a shroud extending along a length of the container bed, the shroud overlying a portion of the drive mechanism.

42. The forage box container of claim 41 wherein the shroud has a central peak formed at the apex of two inclined sides.

43. The forage box container of claim 41 further including a sprocket cover being disposed over a sprocket.

\* \* \* \* \*